United States Patent [19]  [11] 4,076,319
Walker  [45] Feb. 28, 1978

[54] NESTED WHEEL ASSEMBLY

[76] Inventor: Brooks Walker, 807 Francisco St., San Francisco, Calif. 94109

[21] Appl. No.: 702,063

[22] Filed: Jul. 2, 1976

Related U.S. Application Data

[60] Division of Ser. No. 582,087, May 30, 1975, abandoned, which is a continuation-in-part of Ser. No. 507,715, Sept. 20, 1974, abandoned.

[51] Int. Cl.² ............................................. B60B 37/10
[52] U.S. Cl. ...................................... 301/1; 301/5 R
[58] Field of Search ............... 301/1, 5 R, 124 R, 126, 301/131, 134, 135, 63 PW; 280/87.01, 47.26, 31, 87.05, 47.18; 46/23; 16/18 R, 30; 224/42.14–42.16; 190/18 A

[56] References Cited

U.S. PATENT DOCUMENTS

| 1,581,061 | 4/1926 | Johnston | 280/47.26 |
| 2,555,480 | 6/1951 | Fischer | 301/1 X |
| 3,264,780 | 8/1966 | Doe | 46/221 |
| 3,312,236 | 4/1967 | Stewart | 301/1 X |

FOREIGN PATENT DOCUMENTS

| 77,016 | 11/1948 | Czechoslovakia | 224/42.15 |
| 791,806 | 10/1935 | France | 301/5 R |
| 1,505,848 | 4/1969 | Germany | 301/63 PW |

Primary Examiner—Robert B. Reeves
Assistant Examiner—Charles A. Marmor
Attorney, Agent, or Firm—Gordon Wood

[57] ABSTRACT

Wheel structures are made removable from the body which they support. Each wheel structure includes a solid wheel which is normally imperforate between the hub and the rim and an axle on which the wheel is rotatably secured. The web of each wheel between the hub and the rim is provided with apertures complementarily formed relative to the axles for receiving the axle or axles of another wheel or wheels therethrough to permit nesting the wheel structures.

3 Claims, 11 Drawing Figures

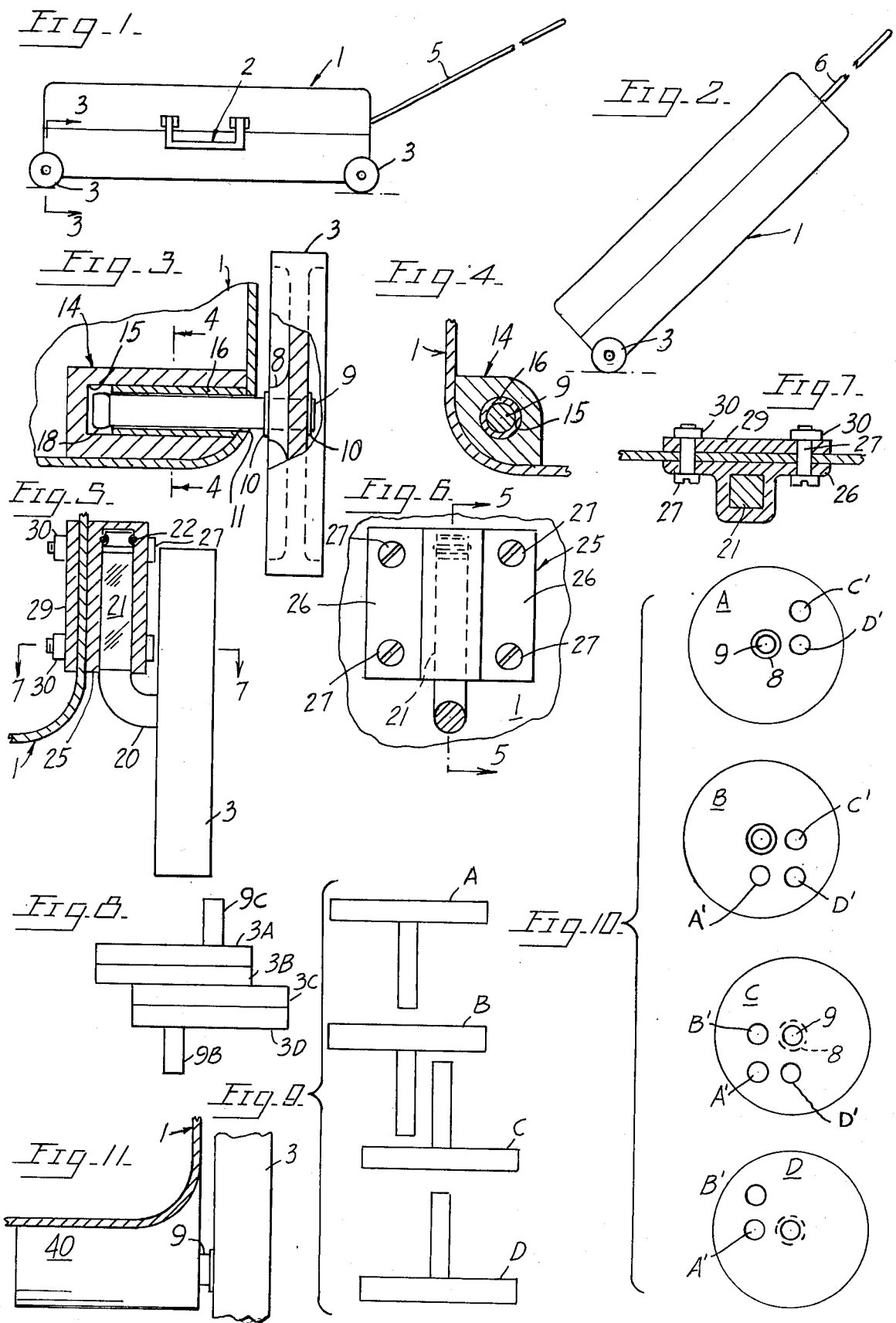

NESTED WHEEL ASSEMBLY

This application is a division of application Ser. No. 582,087, filed May 30, 1975 now abandoned, which is a continuation-in-part of application Ser. No. 507,715, filed Sept. 20, 1974, now abandoned.

This invention relates to suitcases of the type provided with ground wheels to facilitate transporting the same. Many prior art wheeled suitcases have the disadvantage that when being handled in the normal manner the wheels or other projections are subject to damage. The main object of the present invention is the provision of a wheeled suitcase in which the wheels are readily removable so that the wheels and other parts of the suitcase structure are not subject to damage during rough handling.

Another object of the invention is the provision of a wheeled suitcase having readily removable wheels and which suitcase is constructed as to have no unnecessary projections that may be subject to damage.

Yet another object of the invention is the provision of a wheeled suitcase having wheels constructed so as to be readily nested when the said wheels are being carried separate from the suitcase.

Other objects and advantages will be apparent from the following specification and from the drawings.

FIG. 1 is a side elevation of a suitcase supported on four ground wheels.

FIG. 2 is a side elevation of a suitcase having two ground wheels.

FIG. 3 is a greatly enlarged fragmentary cross section through the suitcase and one of its ground wheels as taken in a plane indicated by lines 3—3 of FIG. 1.

FIG. 4 is a cross section taken in a plane indicated by lines 4—4 of FIG. 3.

FIG. 5 is a view similar to FIG. 3 but showing another means for mounting the wheel.

FIG. 6 is a side elevation of the structure of FIG. 5 showing the axle of the wheel in section.

FIG. 7 is a horizontal section taken in a plane indicated by lines 7—7 in FIG. 5.

FIG. 8 is a top plan view of four wheels nested in stacked relationship.

FIG. 9 is a semischematic exploded view of the four wheels in separated positions before nesting.

FIG. 10 is an exploded view of four wheels showing the arrangement of apertures therein to permit nesting.

FIG. 11 is a view similar to FIG. 3 showing a wheel mount on the exterior side of the suitcase.

In FIG. 1 a suitcase generally designated 1 is provided on one of the narrow sides thereof with a handle 2 and wheels 3 secured to opposite corners of said narrow side in a manner to be described. Another pair of wheels (not shown) are of course provided on the opposite narrow side of the suitcase. A suitable pulling means such as a bridle 5 may be employed for pulling the suitcase. In FIG. 2 only one pair of wheels 3 are provided and the suitcase may be pulled at an angle to the horizontal by means of handle 6.

As best seen in FIGS. 3, 4, each wheel 3 is provided with a central hub 8 provided with a bore in which one end of an axle 9 is rotatably supported. Axial movement of the wheel relative to axle 9 is prevented by a pair of snap rings 10. The axle 9 extends through an opening 11 in the sidewall of the suitcase 1 and into a mount generally designated 14. The mount 14 is shaped to conform to the inner side of suitcase 1 and it may be adherently secured thereto by a suitable adhesive. The mount 14 is provided with an elongated hole 15 in which is secured a sleeve 16 preferably formed with an antifriction plastic.

The axle 9 is supported in sleeve 16 and it is formed at its inner end with a slight annular protruberance 18 which may be forceably pressed through the sleeve 14 but which prevents removal of the axle under normal operating conditions. When it is desired to remove the wheel 3 it is merely necessary to pull on said wheel to force the protruberance 18 along the length of bearing 16.

Alternative means for supporting the ground wheels 3 is shown in FIGS. 5-7 wherein the wheel 3 is provided with an axle 20 which is bent at right angles as shown in FIG. 5 and which is formed along the length of the bent portion with a square cross section indicated at 21. Above the square portion the axle is again formed to a round cross section and formed with a groove to cooperate with snap ring 22 positioned in the mount 25. As best seen in FIG. 6 the mount 25 is formed with a pair of flanges 26 which are adapted to receive therethrough machine screws 27 or rivets. Said machine screws 27 pass through suitable apertures in the side wall of suitcase 1 and also through apertures in an inner plate 29. By means of nuts 30, the mount 25 is thus fixedly secured to the suitcase.

It will be noted that the structure of FIGS. 5-7 may be readily mounted on the suitcase by the owner without requiring special skills or tools. Also it will be noted that the wheel 3 and axle 20 may be readily removed simply by pulling downwardly on the wheel 3.

Another form of the invention is shown in FIG. 11 wherein the wheel mount 40 is fixedly secured to the exterior of the suitcase by a suitable adhesive or self tapping screws securing the suitcase to the mount from the inside so that the wheel 3 and its axle 9 may be plugged into the mount 40 in the same manner as shown in FIG. 3. It will also be noted that the structure of FIG. 11 lends itself to use with the structure of FIG. 5 wherein the mount 40 can be secured to the suitcase by means of machine screws or rivets. It will also be noted that when four mounts 40 are employed on the side of the suitcase opposite the handle 2, said mounts in effect provide supporting pads for the suitcase when the latter is used in a normal manner.

In the schematic view of FIG. 8, the four wheels 3A-3D are shown in stacked nested arrangement. The structure permitting this compact arrangement is shown in FIGS. 9-10 wherein the wheels A-D are formed with apertures A'-D' in order to permit the axles of adjacent wheels to be received therethrough. In other words, in FIG. 10 wheel A is provided with apertures C', D' for receiving the axles 9C, 9D of wheels C and D therethrough. The apertures in the other wheels are indicated in the remainder of FIG. 10 to permit the nesting shown in FIG. 8.

In most cases it is desirable to keep the wheels 3 in another piece of luggage while they are not being used on the suitcase. If desired, however, they may of course be stored in the suitcase when not in use.

I claim:

1. In an assembly of a pair of wheel structures, each including a solid wheel normally imperforate between hub and rim and an axle on which the wheel is rotatably supported and secured against removal therefrom, means for nesting said wheel structures to reduce the space occupied thereby comprising:

each of said wheels being formed with an aperture complementarily formed relative to an axle and positioned between its hub and rim to receive the axle of the other wheel structure therethrough with said wheels positioned in closely adjoining relationship.

2. An assembly according to claim 1 wherein a third wheel structure is positioned outwardly of one of said pair of wheels, each of said pair of wheels being provided with an additional aperture between hub and rim for receiving the axle of the third wheel therethrough, and the third wheel having an aperture receiving the axle of the other of said pair of wheels.

3. An assembly according to claim 2 wherein a fourth wheel structure is positioned on the opposite side of said pair from said third wheel structure, wherein each of said pair of wheels and said third wheel are provided with apertures for receiving the axle of said fourth wheel therethrough and the fourth wheel having two apertures receiving the axles of the third wheel and said one of said pair of wheels.

* * * * *